(12) United States Patent
Jenkins, Jr. et al.

(10) Patent No.: US 9,073,535 B2
(45) Date of Patent: Jul. 7, 2015

(54) UTILITY VEHICLE

(75) Inventors: Philip Joseph Jenkins, Jr., Ponchatoula, LA (US); Joshua Robert Turner, Roseland, LA (US); Bradley Michael Roberts, Ponchatoula, LA (US); Jonathan Melven Kemp, Roseland, LA (US); Shawn Joseph Arnone, Kentwood, LA (US)

(73) Assignee: American Sportworks LLC, Fort Wayne, IN (US)

( * ) Notice: Subject to any disclaimer, the term of this patent is extended or adjusted under 35 U.S.C. 154(b) by 24 days.

(21) Appl. No.: 13/440,097

(22) Filed: Apr. 5, 2012

(65) Prior Publication Data

US 2012/0259493 A1  Oct. 11, 2012

Related U.S. Application Data

(60) Provisional application No. 61/471,820, filed on Apr. 5, 2011.

(51) Int. Cl.
| | | |
|---|---|---|
| *B60K 8/00* | (2006.01) | |
| *B60W 10/08* | (2006.01) | |
| *B60K 1/04* | (2006.01) | |
| *B60W 10/06* | (2006.01) | |
| *B62D 59/04* | (2006.01) | |
| *B60W 20/00* | (2006.01) | |

(52) U.S. Cl.
CPC .................. *B60W 10/08* (2013.01); *B60K 8/00* (2013.01); *B60K 2001/0444* (2013.01); *B60W 10/06* (2013.01); *B62D 59/04* (2013.01); *B60W 20/00* (2013.01); *B60W 2540/10* (2013.01); *B60W 2300/40* (2013.01); *Y02T 10/6286* (2013.01)

(58) Field of Classification Search
CPC .... B60K 5/10; B60K 8/00; B60K 2001/0444; B60L 2200/28; D62D 59/00; D62D 59/04; D62D 63/065; B60W 10/08
USPC ........................................................... 701/22
See application file for complete search history.

(56) References Cited

U.S. PATENT DOCUMENTS

| | | | | |
|---|---|---|---|---|
| 4,289,212 | A | * | 9/1981 | Immel .......................... 180/19.1 |
| 4,351,405 | A | * | 9/1982 | Fields et al. ............. 180/65.225 |
| 4,771,838 | A | * | 9/1988 | Ketcham ...................... 180/6.62 |
| 4,923,025 | A | * | 5/1990 | Ellers ......................... 180/65.23 |
| 5,350,029 | A | * | 9/1994 | Figueroa ......................... 180/11 |
| 5,627,438 | A | * | 5/1997 | Barrett ........................ 318/139 |
| 5,701,062 | A | * | 12/1997 | Barrett ............................ 318/51 |
| 5,816,349 | A | * | 10/1998 | Hankins ........................ 180/11 |
| 6,360,836 | B1 | * | 3/2002 | Milano et al. ................ 180/65.6 |

(Continued)

FOREIGN PATENT DOCUMENTS

DE         3829638  A1 *   6/1989   ............... B60K 1/00

*Primary Examiner* — John Q Nguyen
*Assistant Examiner* — Michael Whalen
(74) *Attorney, Agent, or Firm* — Banrnes & Thornburg LLP (57) ABSTRACT

A utility vehicle is provided that includes first and second pairs of wheels, a controller, and a potentiometer. The first pair of wheels is propelled by an internal combustion engine. The second pair of wheels is propelled by a battery-operated motor. The motor drives a transaxle that drives the second pair of wheels. The controller controls operation of the motor. The potentiometer is configured to be manually activated to propel the utility vehicle, and is coupled to the controller to send a signal to the controller to rotate the motor. The potentiometer is also configured to activate fuel flow into the internal combustion engine.

3 Claims, 8 Drawing Sheets

(56) References Cited

U.S. PATENT DOCUMENTS

| | | | |
|---|---|---|---|
| 7,475,747 B2* | 1/2009 | Plishner | 180/65.31 |
| 8,215,436 B2* | 7/2012 | DeGrave et al. | 180/165 |
| 8,261,859 B2* | 9/2012 | Duehring | 180/11 |
| 8,302,724 B2* | 11/2012 | Gillingham et al. | 180/242 |
| 8,365,849 B2* | 2/2013 | Bartel | 180/14.2 |
| 8,727,426 B2* | 5/2014 | Vitale et al. | 296/193.04 |
| 2003/0132664 A1* | 7/2003 | Grand et al. | 303/20 |
| 2007/0193795 A1* | 8/2007 | Forsyth | 180/65.4 |
| 2008/0169144 A1* | 7/2008 | DeGrave et al. | 180/165 |
| 2009/0229895 A1* | 9/2009 | Gibbs | 180/11 |
| 2010/0065344 A1* | 3/2010 | Collings, III | 180/2.1 |
| 2010/0096197 A1* | 4/2010 | Stoddart | 180/11 |
| 2010/0314183 A1* | 12/2010 | Olsen et al. | 180/65.1 |
| 2010/0317484 A1* | 12/2010 | Gillingham et al. | 477/7 |
| 2010/0317485 A1* | 12/2010 | Gillingham et al. | 477/7 |
| 2011/0042154 A1* | 2/2011 | Bartel | 180/11 |
| 2011/0224887 A1* | 9/2011 | Mueller | 701/103 |
| 2012/0037435 A1* | 2/2012 | Duehring | 180/11 |
| 2012/0185129 A1* | 7/2012 | Carrier | 701/36 |
| 2012/0226405 A1* | 9/2012 | Gillingham et al. | 701/22 |
| 2013/0060410 A1* | 3/2013 | Crain et al. | 701/22 |
| 2013/0241236 A1* | 9/2013 | Vitale et al. | 296/193.04 |

\* cited by examiner

UTILITY VEHICLE

RELATED APPLICATIONS

The present application relates to and claims priority to U.S. Provisional Patent Application Ser. No. 61/471,820, filed on Apr. 5, 2011. The subject matter disclosed in that provisional application is hereby expressly incorporated into the present application.

TECHNICAL FIELD AND SUMMARY

The following disclosure relates to a utility vehicle. More particularly, this disclosure relates to a utility vehicle having both electrical and internal combustion means for it moving from one location to another.

The utility vehicle of the present disclosure is used for personal transportation and light hauling applications. They are not utility automobiles or trucks. Instead, these utility vehicles are typically employed in off-road-type applications to carry persons and materials from one location to another. The utility vehicle of the present disclosure includes gas and electrical power modes of moving. In such off-road applications it may be beneficial to employ either an internal combustion engine or an electric power motor. On one hand, when low noise is needed for short distant travel, the electric motor is available. On the other hand, for longer travel, or where more power is needed, the internal combustion engine is available.

An illustrative embodiment includes a utility vehicle having a pusher cart coupled thereto. The pusher cart includes a pair of wheels that are movable via an illustrative transaxle coupled to a motor. The motor and direction of travel of the wheels (forward, reverse, neutral) can be controlled via a controller assembly located in the utility vehicle and tethered to the pusher cart. This allows the driver to switch the vehicle's engine off, turn the pusher cart on, and continue operating the vehicle. A potentiometer controls how fast or slow the pusher cart wheels rotate.

The pusher cart further includes a hitch assembly configured to attach to the hitch of the utility vehicle. In an illustrative embodiment, the hitch assembly is configured to provide rigid attachment between the pusher cart and the utility vehicle. In other words, unlike conventional trailers and other implements, the pusher cart is not pivotable on a horizontal place with respect to the utility vehicle. The pusher cart propels the utility vehicle in a straight line. The driver turns the vehicle's steering wheel right or left to change the vehicle's direction.

Another illustrative embodiment of the pusher cart includes transferring weight from the utility vehicle into the pusher cart. The utility vehicle weighs more than the cart so by transferring weight back to the pusher cart, the pusher cart's wheels grip the ground sufficiently to push the cart. Without this weight transfer, the pusher cart's wheels may not have enough weight and will merely spin without moving the vehicle.

It is appreciated that the pusher cart may have a variety of configurations. It may have an electric engine, a gasoline powered engine, or a combination of both. It may be configured to push a variety of utility vehicles whether that vehicle is gasoline powered, electric powered, or both. When the cart is not in use, it is simply towed behind. In an illustrative embodiment, towing the cart rotates its wheels which can be attached to a generator for recharging the battery. The rotation generates energy which can be stored and used by the cart when pushing the vehicle.

In one illustrative embodiment, linkage arms engage a frame on the pusher cart to affect the load that transfers from the utility vehicle to the pusher cart. If, for example, the links between the utility vehicle and pusher cart are generally horizontally-oriented (i.e. parallel with the ground surface), little to no weight of the vehicle transfers back to the cart. This means when it is activated the cart's wheels may merely spin out and not actually push the utility vehicle. In contrast, if the links are vertically angled between the utility vehicle and the pusher cart, enough weight from the vehicle is transferred to the cart preventing the wheels from spinning out. Instead the pusher cart moves the utility vehicle. For example, an upward angle of a lower link transfers linear force into the parent vehicle. The angle of the lower link transfers weight into the pusher vehicle from the parent vehicle. This force on the upward angle generates downward force into the pusher tires, enabling them to achieve adequate traction to drive the parent vehicle. Without this transfer of forces and weight, the pusher vehicle will not achieve adequate traction to propel the parent vehicle.

A utility vehicle is provided that comprises first and second pairs of wheels, a controller, and a potentiometer. The first pair of wheels is propelled by an internal combustion engine. The second pair of wheels is propelled by a battery-operated motor. The motor drives a transaxle that drives the second pair of wheels. The controller controls operation of the motor. The potentiometer is configured to be manually activated to propel the utility vehicle, and is coupled to the controller to send a signal to the controller to rotate the motor. The potentiometer is also configured to activate fuel flow into the internal combustion engine.

In the above and other embodiments, the utility vehicle may further include at least one of the wheels of the first or second pair of wheels be coupled to a generator. As a consequence, as the at least one wheel rotates it rotates the generator which is coupled to a battery that operates the motor. The generator then recharges the battery as the at least one wheel rotates.

Additional features and advantages of the utility vehicle will become apparent to those skilled in the art upon consideration of the following detailed descriptions exemplifying the best mode of carrying out the utility vehicle as presently perceived.

BRIEF DESCRIPTION OF DRAWINGS

The present disclosure will be described hereafter with reference to the attached drawings which are given as non-limiting examples only, in which:

FIG. 8 is a schematic side view of wheels of the cart and the vehicle with links extending there between; and FIG. 9 is another schematic side view of wheels of the cart and the vehicle with a long tongue attachment extending there between.

Corresponding reference characters indicate corresponding parts throughout the several views. The exemplification set out herein illustrates embodiments of the utility vehicle and such exemplification is not to be construed as limiting the scope of the utility vehicle in any manner.

DETAILED DESCRIPTION OF THE DRAWINGS

Figure 1:
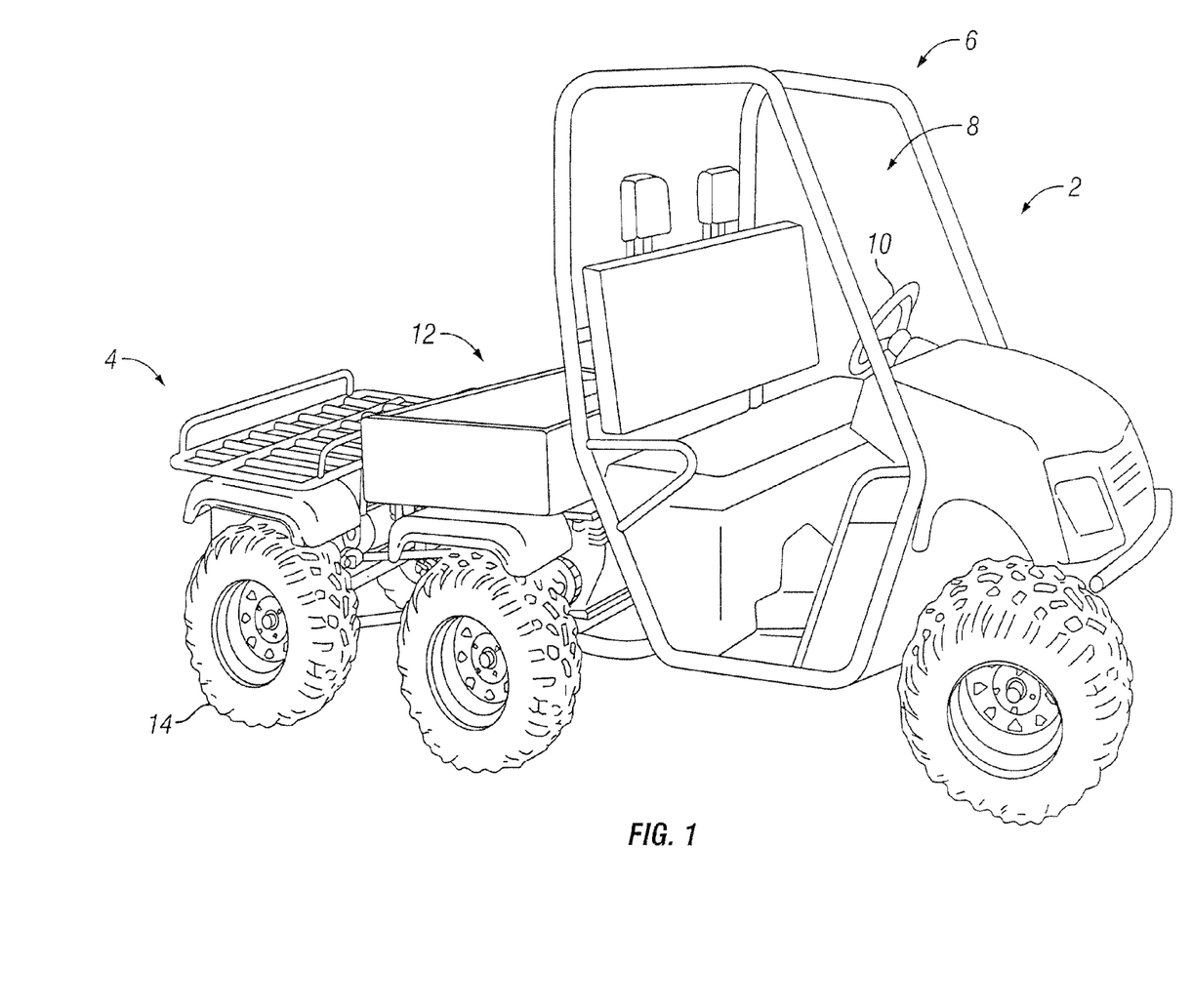
FIG. 1 is a perspective view of a utility vehicle with a pusher cart attached thereto.

A perspective view of a utility vehicle 2 with a pusher cart 4 towed there behind is shown in FIG. 1. Vehicle 2 includes a cab section 6 with a seat portion 8 and steering wheel 10. A cargo area 12 is illustratively positioned behind cab section 6. In this illustrative embodiment, vehicle 2 is a gasoline powered utility vehicle, and although it functions sufficient to transport persons and/or material from one place to another, it may be noisy. While the engine moves vehicle 2, cart 4 is simply towed behind. Pusher cart 2 is configured such that its wheels 14 and 16 rotate and do not impede vehicle 2's progress. At the same time, however, because wheels 14 and 16 are rotating, in an illustrative embodiment, the energy created may be captured and stored to provide additional power to pusher cart 4 while it is operating.

This feature allows pusher cart 4, when towed behind vehicle 2, to generate charge for the batteries via the generator function of the electric motor in pusher cart 2. Energy is produced from the ground engaging wheels 14 and 16 of pusher cart 4 being towed behind the utility vehicle. This ground engagement is transferred into torque in the cart's axle, and subsequently transferred to the electric motor. The electric motor has a generator function that allows it to produce electric energy when rotated by an outside force. In this case, wheels 14 and 16. This electric power can be captured and stored in the batteries of the pusher vehicle.

Figure 2:
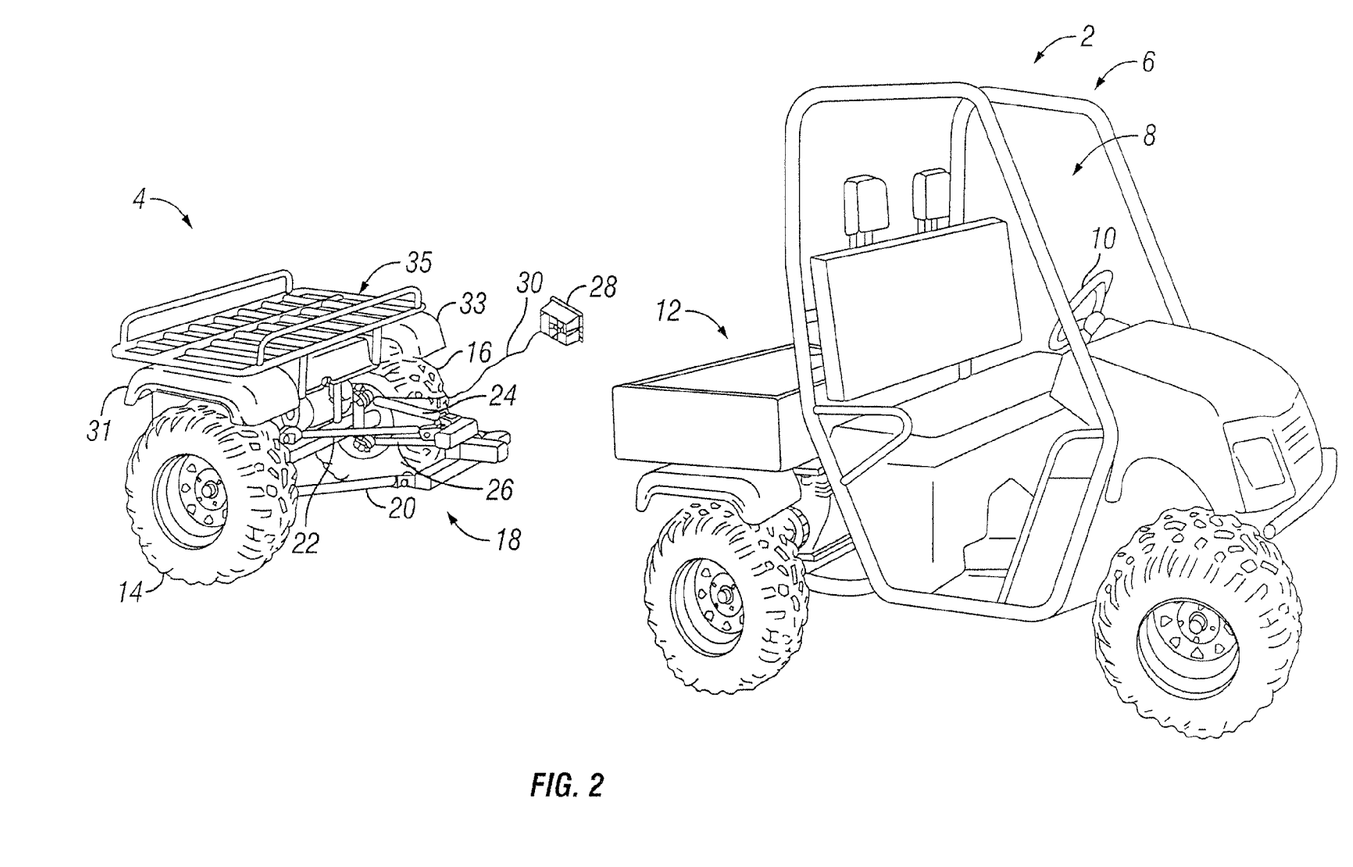
FIG. 2 is a another perspective view of the vehicle and cart.

Another perspective view of vehicle 2 and cart 4 is shown in FIG. 2. This view differs from the view of FIG. 1 in that cart 4 is shown separated from vehicle 2. This view shows how hitch assembly 18 on cart 4 is illustratively an "Archimedes Hitch" that may produce weight transfer from vehicle 2 into the pusher cart 4. Illustrative hitch assembly 18 does not allow cart 4 to pivot with respect to vehicle 2 in contrast to typical tow-behind attachments. In addition, hitch assembly 18 is shown spaced apart from cart 4 by links 20, 22, 24, and 26. As further discussed herein, these links attach cart 4 to hitch 18 at an angle with respect to the ground surface so that at least some of the weight of vehicle 2 transfers to cart 4. This allows tires 14 and 16 generate enough traction on the ground surface to push vehicle 2 forward. Otherwise, the weight difference between vehicle 2 and cart 4 may cause wheels 14 and 16 to simply spin without moving vehicle 2 forward. Also shown in this view is control pod 28 tethered to cart 4 via electrical harness 30. Pod 28 is illustratively designed to be located within the cab section 6 of vehicle 2 to control the operation of cart 4. Illustratively, on/off, hi/lo modes, forward, reverse, and neutral drives can be controlled from pod 28. This view also shows fenders 31 and 33 sitting above wheels 14 and 16 respectively along with an illustrative cargo rack 35 sitting on top of cart 4.

Figure 3:
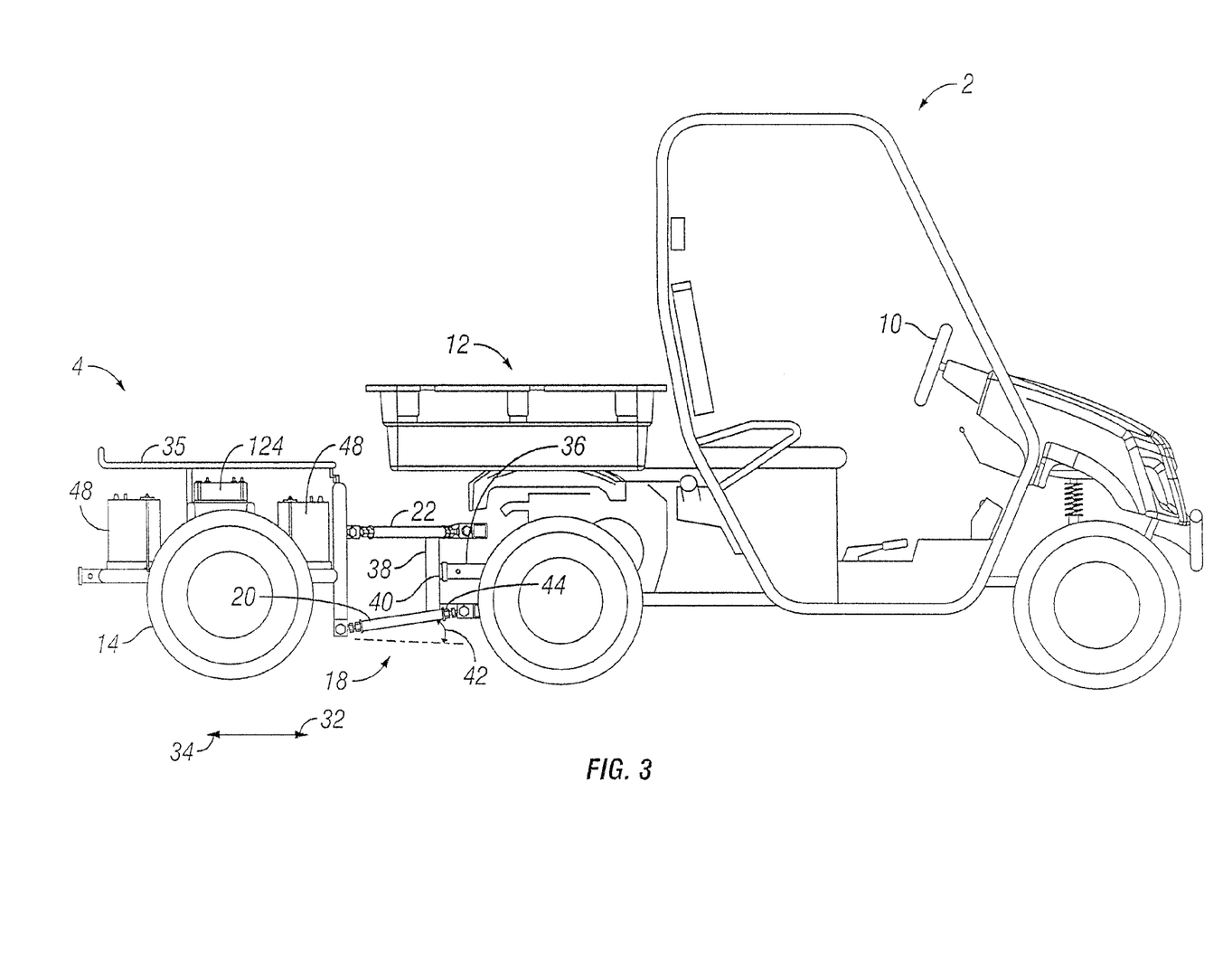
FIG. 3 is a side view of the utility vehicle and cart.

A side view of utility vehicle 2 with pusher cart 4 attached thereto is shown in FIG. 3. As will be appreciated from this view, when the engine of utility vehicle 2 is not on, pusher cart 4 is in a position to move utility vehicle 2 in either directions 32 or 34. This view also shows how hitch assembly 18 couples to receiver 36. In this illustrative embodiment, hitch 18 includes a bar 38 that hitch bar 40 attaches to for establishing a rigid connection between vehicle 2 and cart 4. Cart 4 is, therefore, not pivotable with respect to vehicle 2. Pusher cart 4 may move vehicle 2 backward or forward. In other words, pusher cart 4 despite having an additional set of wheels, serves as a supplemental motor or engine. Control of the vehicle's turning capabilities is still made using steering wheel 10 as previously discussed. In certain embodiments that motor may be a silent motor in contrast to vehicle 2's motor. It is appreciated that in other embodiments the connection between vehicle 2 and cart 4 can be made using other links that still offer the rigid attachment between structures. This view also shows angle 42 that link 20 makes with respect to vehicle 2 and cart 4 relative to the ground surface. Illustrative angles may vary based on application. The angles that are illustratively above are level to the ground for the top link, and about 10 degrees upward on the lower link. As shown, end 44 is higher than end 46 of link 20 with respect to the ground surface. This difference in height, transfers a downward force from vehicle 2 to pusher cart 4 so that as wheels 14 and 16 rotate there is sufficient weight transferred from utility vehicle 2 to pusher cart 4 to create sufficient traction to rotate wheels 14 and 16 without spinning out. For example, if all the links between vehicle 2 and cart 4 were parallel with the ground or at equal height above ground surface from end to end, there would not be sufficient load transferred between the two structures. Cart 4 can weigh less than vehicle 2 creating a situation where a lighter structure is attempting to move a heavier structure. In this case the wheels would just spin as the friction between the ground surface and the wheels is not sufficient to overcome the weight of vehicle 2. With the angled links and load transfer, sufficient friction exists between the ground surface and wheels 14 and 16 to create enough grip so the rotating wheels will push vehicle 2. This view also shows cargo rack 35, batteries 48 and motor controller 124. Cargo area 12 on vehicle 2 is also shown to demonstrate illustrative proximity to cart 4.

Figure 4:
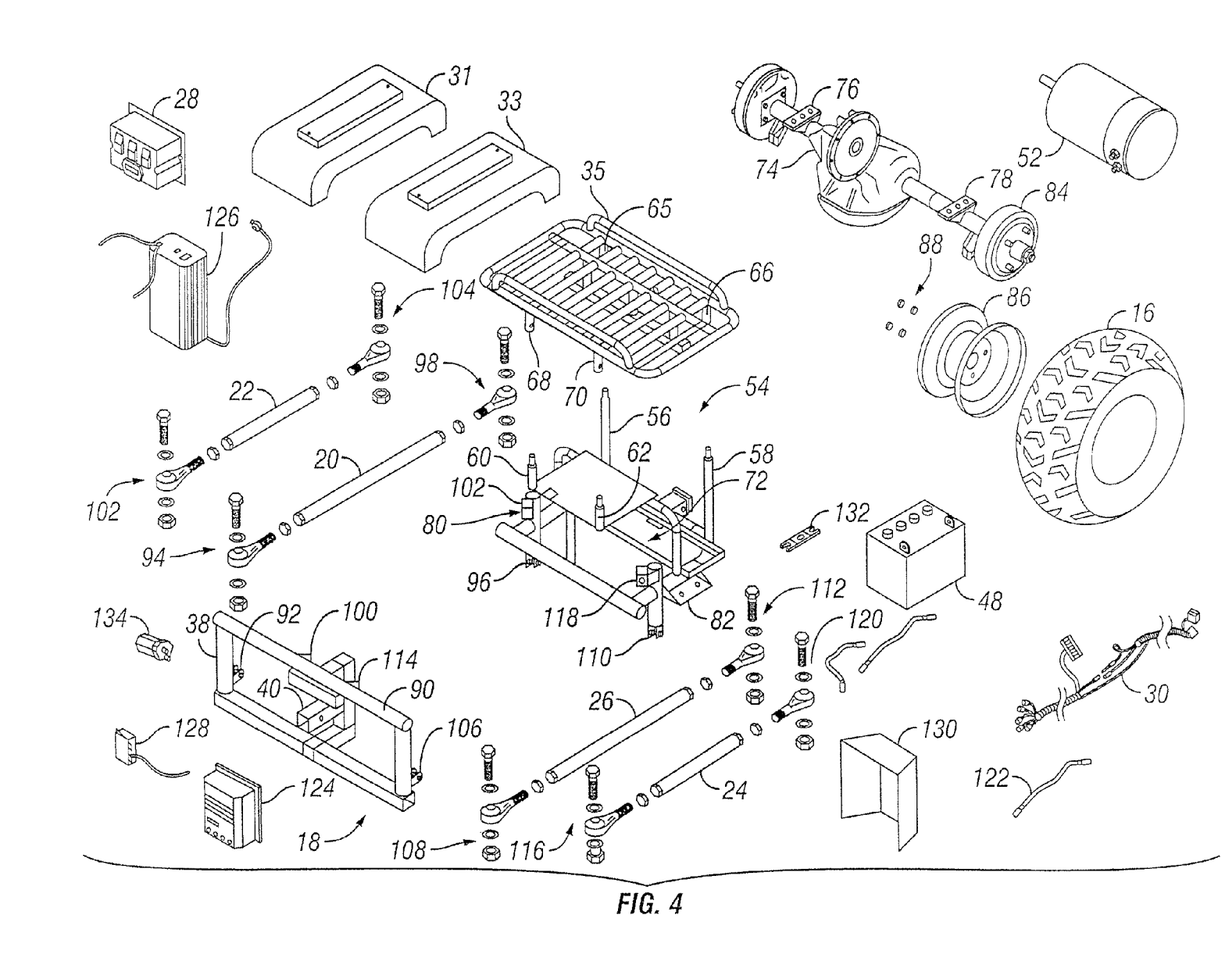
FIG. 4 is an exploded view of the pusher cart.

An exploded view of pusher cart 4 is shown in FIG. 4. This view includes a frame assembly 54. It is appreciated that the configuration of frame 54 is illustrative and is sized to hold the components of cart 4. It is also appreciated that in other embodiments it may be reconfigured to accommodate structures of different type and shape than that illustratively shown herein. In this illustrative embodiment, frame 54 includes posts 56, 58, 60 and 62 that are used to attach to corresponding depending posts 64, 66, 68 and 70 of cargo rack 35. A result of this assembly is a cavity 72 is formed in frame 54 to accommodate other components used in cart 4. As shown herein, motor 52 couples to transaxle 74 to rotate wheels 14 and 16. In this illustrative embodiment, brackets 76 and 78 attach to corresponding brackets 80 and 82 on frame 54. Gears inside transaxle 74 are configured to translate the rotational movement of motor 52 into rotational movement of wheels 14 and 16 in forward and reverse directions. These functions are controlled by the motor controller 124, via control pod 128 which is controlled by manual controls in vehicle 2. In the illustrative embodiment shown, hub 84 on transaxle 74 attaches to rim 86 that fits in tire 16 and all attached as a unit via fasteners 88. Although not shown, wheel 14 is attached to transaxle 74 in the same manner. It is further appreciated that attaching wheels to the axle may be made in any variety of manners known to one skilled in the art. Also shown in this view are links 20 through 26. (See also FIGS. 2 and 3). These links are coupled at one end to frame 54 and the other to bracket 90 of hitch assembly 18. For example, lower link 20 attaches at one end to bracket 92 via fastener assembly 94 and at the other end to bracket 96 on frame 54 via another fastener assembly 98. In similar fashion, one end of link 22 attaches to bracket 100 via fastener assembly 102 and to bracket 102 via another fastener assembly 104. Link 24 attaches at one end to bracket 106 via fastener assembly 108 and the other end to bracket 110 via fastener assembly 112. Lastly, link 24 attaches to bracket 114 via fastener assembly 116 and at the other end to bracket 118 via fastener assembly 120. It is appreciated that with hitch bar 40 rigidly attached to bracket 90, cart 4 does not pivot with respect to vehicle 2.

Also shown in this view is battery 48 that uses lines 120 and 122 to connect to motor 52. It is appreciated battery 48 may be single or a plurality of batteries. Control pod 28 is attached to cart 4 via wire harness 30 to activate and control motor 52. A motor controller 124 is attached to both wire harness 30 and motor 52 to control the operation of motor 52 via control pod potentiometer 128. An auxiliary battery charger is illustratively provided to enable the batteries to charge via household current. The battery charger is either onboard or separate, and will connect two charge wires to the batteries and a standard 120V household current plug to power the charger. Potentiometer 128 provides signal to the Controller 124 to regulate the speed of the vehicle. A cover 130 is illustratively configured to cover motor controller 124. Fuse 132 such as a 500 amp fuse protects the circuits in case of a short circuit solenoid/contactor 134 is activated by controller 124 to allow the full 500 amps of potential current to flow to the motor 52 as needed.

Figure 5:
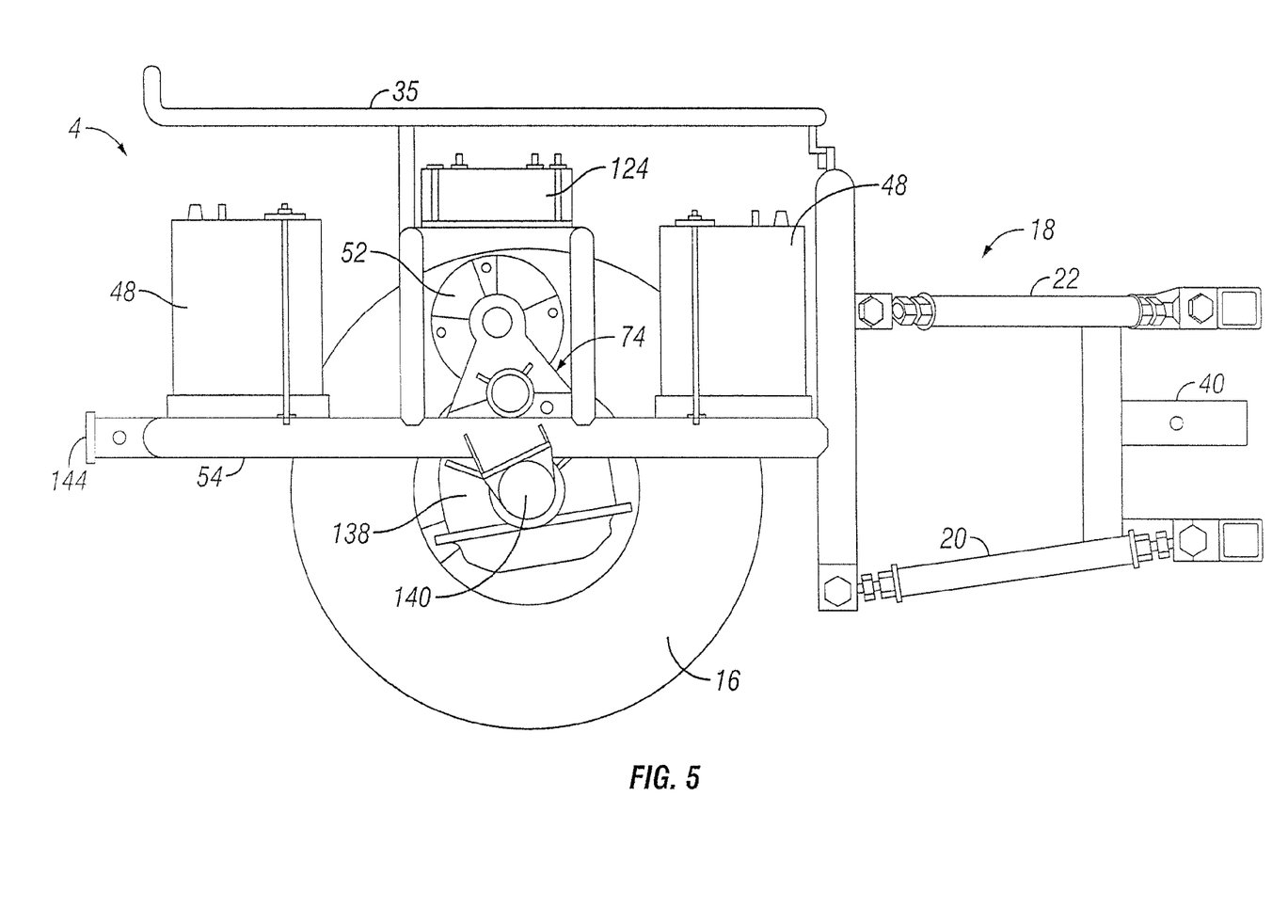
FIG. 5 is a side sectional view of the cart.

A side sectional view of cart 4 is shown in FIG. 5. This view better shows the location of several of the components that make cart 4 move. As shown herein, frame 54 is attached to transaxle 74 which is attached to both wheel 16 and motor 52. Cargo rack 35 is located atop cart 4. In this illustrative embodiment, cart 4 shows two batteries 48 (although four batteries may be used) to power motor 52. As shown herein, transaxle 54 includes a gear box 138 and axle 140 to control the direction and rotation of wheel 16 (and wheel 14 for that matter). Motor controller 124 is illustratively positioned above motor 52. Hitch assembly 18 shown herein includes links 20 and 22 previously discussed as well as hitch bar 40 that extends into receiver 36 on vehicle 2 (see FIG. 3). A hitch receiver 144 is positioned on cart 4 opposite hitch bar 40 to attach additional accessories such as carts or trailers.

Figure 6:
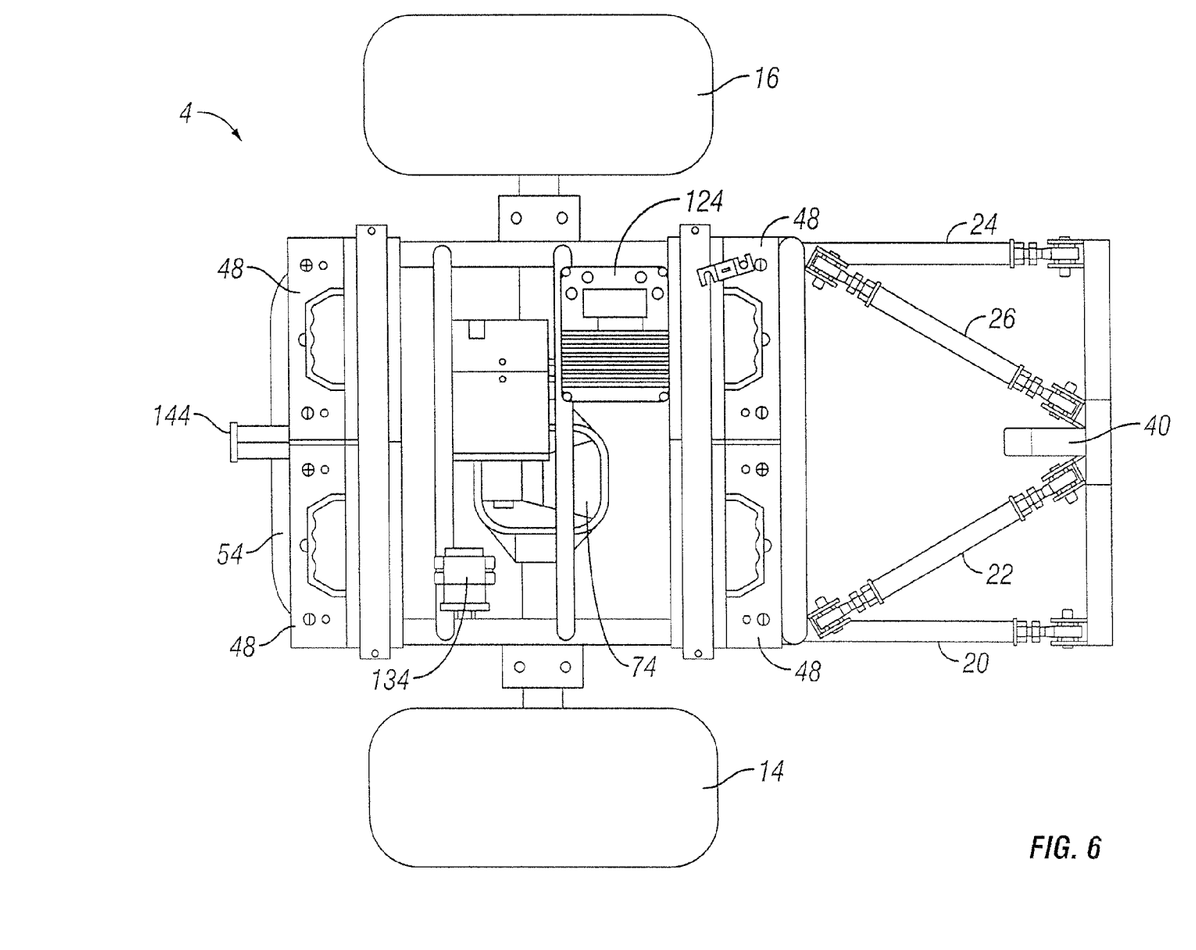
FIG. 6 is a top view of the cart.

A top view of cart 4 is shown in FIG. 6. This view shows the illustrative location of such structures as motor 52, batteries 48, motor controller 124, transaxle 74 on frame 54. Solenoid/contactor 134 is activated by controller 124 to allow the full 500 amps of potential current to flow to the motor 52. This view also demonstrates how top links 22 and 26 are angled inward on a horizontal plane with respect to cart 4. This angle prevents the pusher cart from moving laterally in respect to the utility cart when in use. The angle of links 22 and 26 are also with respect to links 20 and 24. Each of the links have a spherical rod end to allow pusher cart 4 to move vertically and torsionally with respect to vehicle 2. Hitch bar 40 is also shown attached to bracket 90.

Figure 7:
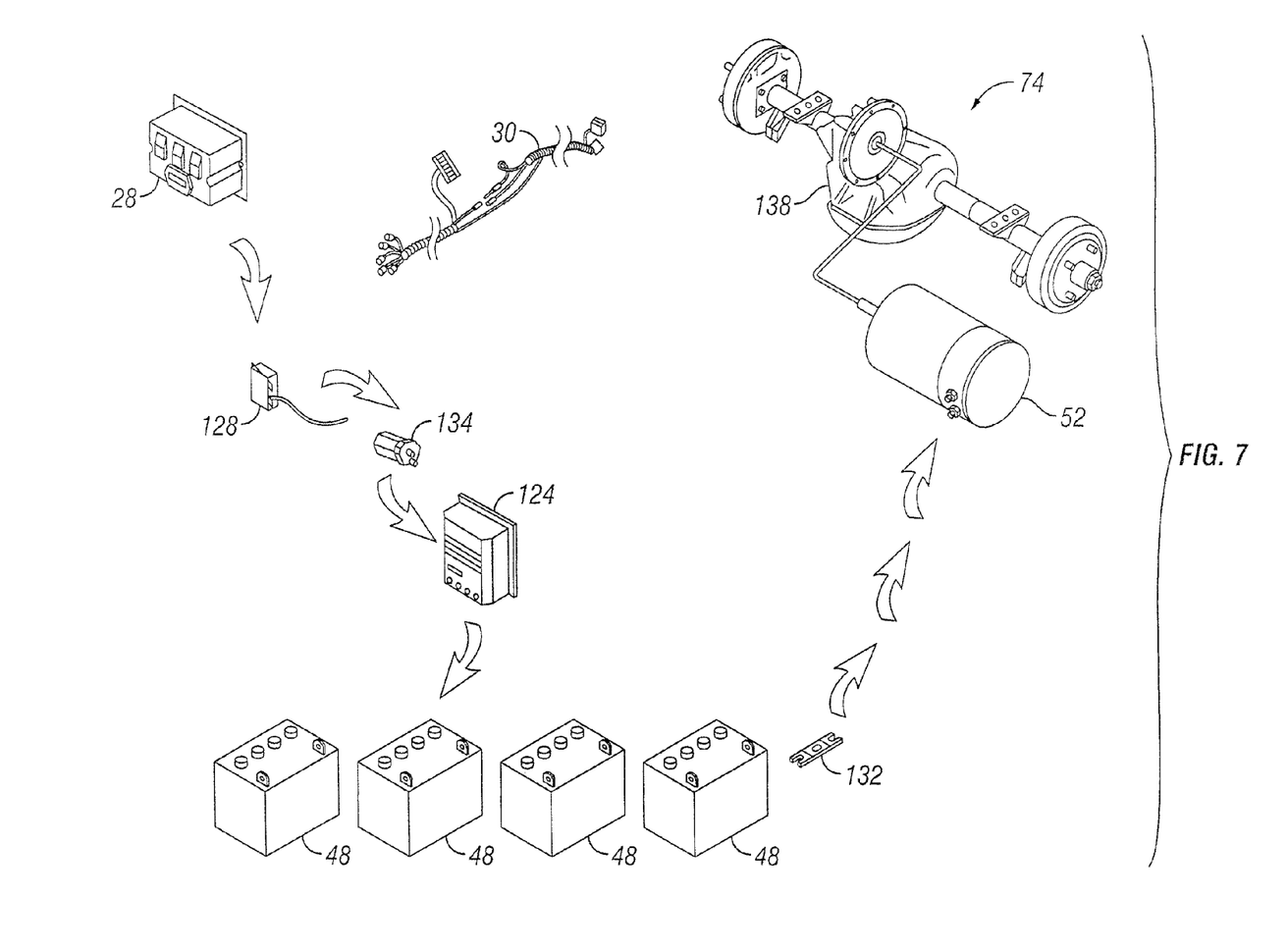
FIG. 7 is an exploded view of the electrical assembly.

An exploded parts view of the electrical assembly is shown in FIG. 7. The control pod 28, as previously discussed, is mounted in the driver compartment of the vehicle. This control pod illustratively activates pusher cart 4 using an on/off switch. In illustrative embodiments, pod 28 may also activate forward, neutral, reverse motor changes as well as high/low modes. It is appreciated that harness 30 connects all the electrical components together.

Potentiometer 128 is connected to the accelerator pedal used to move vehicle 2 via wire harness 30. Acceleration or deceleration of pusher cart 4 is also controlled by potentiometer 128. Illustratively, this potentiometer 128 is an electromechanical device controlled by manual operator controls. With manual input from the operator, potentiometer 128 sends a signal to controller 124 which in turn regulates the speed of the vehicle. This allows operation of pusher cart 4 to have the same feel as the conventional vehicle 2. As the gas pedal is depressed, pusher cart 4 is caused to move faster. Of course, the reverse is true as well—as the gas pedal is released, pusher cart 4 slows down. Solenoid/contactor 134 is activated by controller 124 to allow the full 500 amps of potential current to flow to the motor 52 when needed and is positioned between the potentiometer 128 and motor controller 124 along harness 30. Motor controller 124 receives a signal from potentiometer 128 and subsequently sends battery current to motor 52 to regulate how fast the vehicle moves. Batteries such as batteries 48 supply the power to motor 52. In an illustrative embodiment, multiple batteries such as four 12-volt batteries wired in series may be used to supply sufficient power. It is further appreciated that the quantity and voltage of the batteries needed may be increased or decreased based on the type of vehicle cart 4 needs to move. A fuse 132 is located between the batteries and the motor to prevent excess power to be drawn by the motor. In an illustrative embodiment, fuse 132 may be a 500 amp fuse. Motor 52, such as a 48 volt DC motor rotates the cart's wheels. In an illustrative embodiment, motor 52 rotates gears in a gear box 138 on differential axis 74 which translates rotational movement of motor 52 into the rotational movement of wheels 14 and 16 (see, also, FIG. 6). As it may be appreciated by one skilled in the art, functions known to a driver driving vehicle 2 such as forward, reverse, acceleration, deceleration, on/off are substantially transferred into pusher cart's 4 control system to give the driver a substantially similar experience. This means the driver, once activating pusher cart 4, may accelerate forward, stop, or drive in reverse just as if the gasoline engine was running. This offers a native feel to the driver thereby reducing a learning curve.

Figure 8:
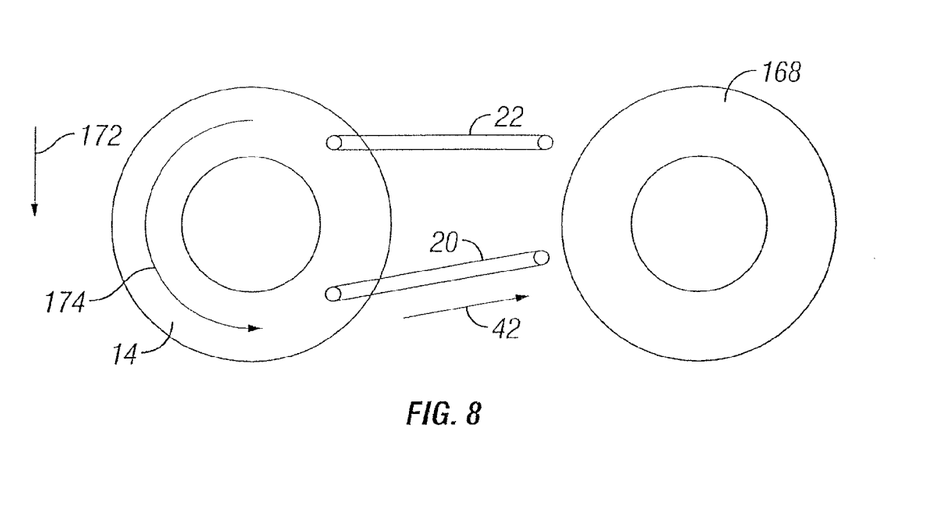

A schematic side view of wheel 14 of pusher cart 4 and wheel 168 of vehicle 2 with links 20 and 22 extending there between is shown in FIG. 8. The upward angle 170 of link 20 transfers a linear force into vehicle 2. This angle 42 transfers a downward force 172 or weight into pusher cart 4 from vehicle 2. This weight allows wheels 14 and 16 to gain traction to move vehicle 2. Powering wheel 14 (as well as wheel 16 for that matter) as indicated by reference numeral 174 applies torque to the axel. The torque generated by pusher cart 2 is transferred into a linear force into vehicle 2 via link 20.

Figure 9:
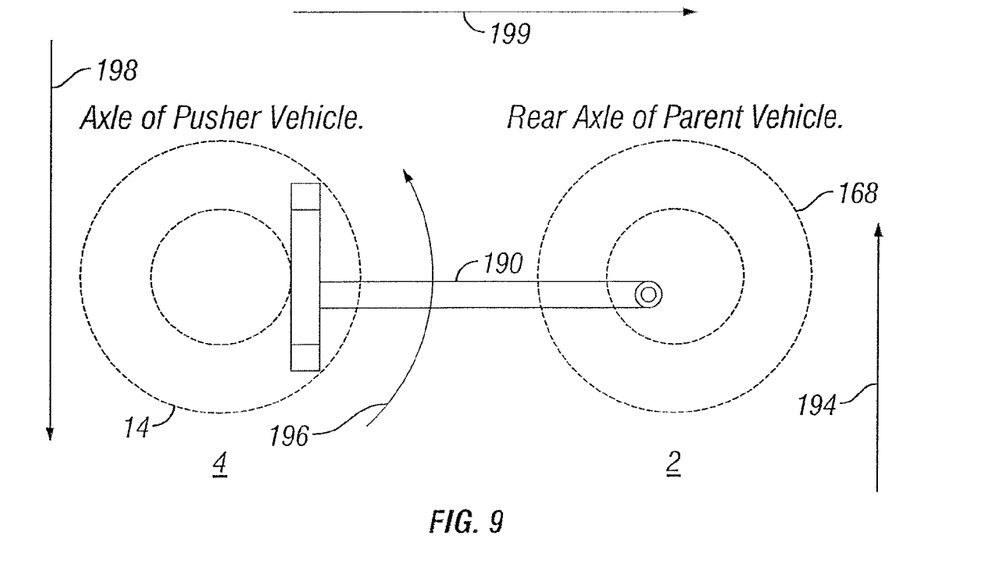

A schematic side view of wheel 14 of pusher cart 4 and wheel 168 of vehicle 2 with a long tongue attachment 190 extending there between is shown in FIG. 9. This alternate attachment means applies sufficient weight from vehicle 2 to cart 4 so the wheels of the cart push the vehicle rather than spinning-out. Tongue attachment 190 is rigidly affixed to the pusher chassis and pivotably affixed to the vehicle 2. Torque indicated by reference numeral 194 generated by the vehicle is transferred into a vertical lift of the parent vehicle, as indicated by reference numeral 194. When wheel 14 of pusher cart 4 begins to rotate in direction 196, the torque produced creates a ground-engaging downward force 198 as shown. If the length and angle of tongue 190 is properly controlled, the correct amount of weight can be transferred from vehicle 2 to pusher cart 4, moving both in direction 199.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:
1. A utility vehicle comprising:
   a first pair of wheels;
   a second pair of wheels located opposite the first pair of wheels;

a first motor that is selected from the group consisting of a first electric motor and a first internal combustion engine;

wherein the first motor selectively moves the second pair of wheels;

a pusher cart selectively attachable to the utility vehicle, wherein the pusher cart includes:

a third pair of wheels;

a second motor configured to move the third pair of wheels;

wherein the second motor is selected from the group consisting of a second electric motor and a second internal combustion engine;

a hitch assembly that attaches to the utility vehicle such that the pusher cart cannot pivot laterally relative to the utility vehicle;

wherein the hitch assembly on the pusher cart also includes a first rod that attaches to the utility vehicle at a first position and to the pusher cart at a second position;

wherein the first position at the utility vehicle is higher in a vertical plane with respect to the second position at the pusher cart so when the third pair of wheels is rotated by the second motor, at least a portion of the weight of the utility vehicle is transferred to the pusher cart; and a controller assembly located in the utility vehicle and tethered to the pusher cart to control the operation of the pusher cart to move the utility vehicle.

2. The utility vehicle of claim 1, wherein the hitch assembly further includes a second rod located adjacent the first rod such that the second rod attaches to the utility vehicle at a third position and to the pusher cart at a fourth position such that the third position at the utility vehicle is higher in the vertical plane with respect to the fourth position at the pusher cart.

3. The utility vehicle of claim 1, wherein the hitch assembly further includes a third rod located higher in the vertical plane than the first rod and attaches to the utility vehicle at a fifth position and to the pusher cart at a sixth position such that the fifth position at the utility vehicle is in about the same horizontal plane as the sixth position at the pusher cart.

* * * * *